(12) United States Patent
Valsecchi et al.

(10) Patent No.: US 9,753,448 B2
(45) Date of Patent: Sep. 5, 2017

(54) MACHINE TOOLS WHICH COMPENSATE FOR THERMAL DEFORMATION

(75) Inventors: Natale Valsecchi, Brescia (IT); Stefano Zucchini, Brescia (IT); Roberto Goffrini, Brescia (IT)

(73) Assignee: INNSE-BERARDI S.P.A., Brescia (IT)

( * ) Notice: Subject to any disclaimer, the term of this patent is extended or adjusted under 35 U.S.C. 154(b) by 644 days.

(21) Appl. No.: 14/001,175

(22) PCT Filed: Dec. 22, 2011

(86) PCT No.: PCT/IB2011/055894
§ 371 (c)(1),
(2), (4) Date: Aug. 23, 2013

(87) PCT Pub. No.: WO2012/114168
PCT Pub. Date: Aug. 30, 2012

(65) Prior Publication Data
US 2013/0325162 A1    Dec. 5, 2013

(30) Foreign Application Priority Data
Feb. 25, 2011    (IT) .............................. BS2011A0020

(51) Int. Cl.
*G05B 19/18* (2006.01)
*B23Q 11/00* (2006.01)
(Continued)

(52) U.S. Cl.
CPC ........ *G05B 19/182* (2013.01); *B23Q 11/0007* (2013.01); *B23Q 17/22* (2013.01);
(Continued)

(58) Field of Classification Search
None
See application file for complete search history.

(56) References Cited

U.S. PATENT DOCUMENTS 5,005,452 A * 4/1991 Wood, III ............ G05B 19/404
82/132
5,284,076 A * 2/1994 Fritz .................... G05B 19/186
318/687
(Continued)

FOREIGN PATENT DOCUMENTS

DE         3620118 A1    12/1987
DE         3823992 A1    1/1990
(Continued)

*Primary Examiner* — Mohammad Ali
*Assistant Examiner* — Kelvin Booker
(74) *Attorney, Agent, or Firm* — Robert E. Alderson, Jr.

(57) ABSTRACT

Machine tools are provided, including machines tools of large dimension, which include a bench, an upright base, control elements for the translation of the upright base, an upright base position sensor comprising an optical line or linear encoder fixed to the bench, detection elements for detecting the temperature of the optical line and management elements for processing the temperature signals coming from the optical line temperature detection elements and the signals of the upright base translation control elements to determine a correction signal for the upright base translation control elements according to at least one temperature detected along the optical line.

21 Claims, 4 Drawing Sheets

(51) Int. Cl.
*G01D 5/34* (2006.01)
*B23Q 17/22* (2006.01)
*G05B 19/404* (2006.01)
*G01D 5/347* (2006.01)

(52) U.S. Cl.
CPC ....... *G01D 5/34746* (2013.01); *G05B 19/404* (2013.01); *G05B 2219/49206* (2013.01)

(56) References Cited

U.S. PATENT DOCUMENTS

| | | | | |
|---|---|---|---|---|
| 5,768,137 | A * | 6/1998 | Polidoro | G05B 19/182 382/152 |
| 5,802,937 | A * | 9/1998 | Day | G05B 19/182 408/10 |
| 5,903,459 | A * | 5/1999 | Greenwood | G05B 19/401 700/108 |
| 5,949,685 | A * | 9/1999 | Greenwood | G05B 19/404 356/634 |
| 6,311,967 | B1 * | 11/2001 | Bickert | B29C 33/303 269/287 |
| 6,345,213 | B1 * | 2/2002 | Graeser | B25J 9/1692 219/124.34 |
| 6,392,222 | B1 * | 5/2002 | Greenwood | G05B 19/404 250/221 |
| 6,415,200 | B1 * | 7/2002 | Kato | G05B 19/401 700/108 |
| 6,449,526 | B1 * | 9/2002 | Sachs | G05B 19/404 700/164 |
| 6,519,860 | B1 * | 2/2003 | Bieg | G01B 5/008 33/1 PT |
| 6,980,881 | B2 * | 12/2005 | Greenwood | G05B 19/401 318/560 |
| 2001/0029674 | A1 * | 10/2001 | Cutler | B23K 26/04 33/1 M |
| 2004/0066508 | A1 * | 4/2004 | Schmadel | G01B 21/042 356/243.1 |
| 2005/0166413 | A1 * | 8/2005 | Crampton | G01B 5/008 33/503 |
| 2006/0021208 | A1 * | 2/2006 | Pfau | G01B 11/02 29/447 |
| 2006/0218811 | A1 | 10/2006 | Sato | |
| 2009/0069926 | A1 | 3/2009 | Ma | |
| 2013/0216333 | A1 * | 8/2013 | Wilson | B21D 22/00 413/1 |

FOREIGN PATENT DOCUMENTS

| | | |
|---|---|---|
| DE | 4238504 A1 | 5/1994 |
| DE | 10007540 A1 | 9/2001 |
| DE | 10225243 A1 | 12/2003 |
| EP | 0372302 A2 | 6/1990 |
| EP | 1128156 A1 | 8/2001 |

* cited by examiner

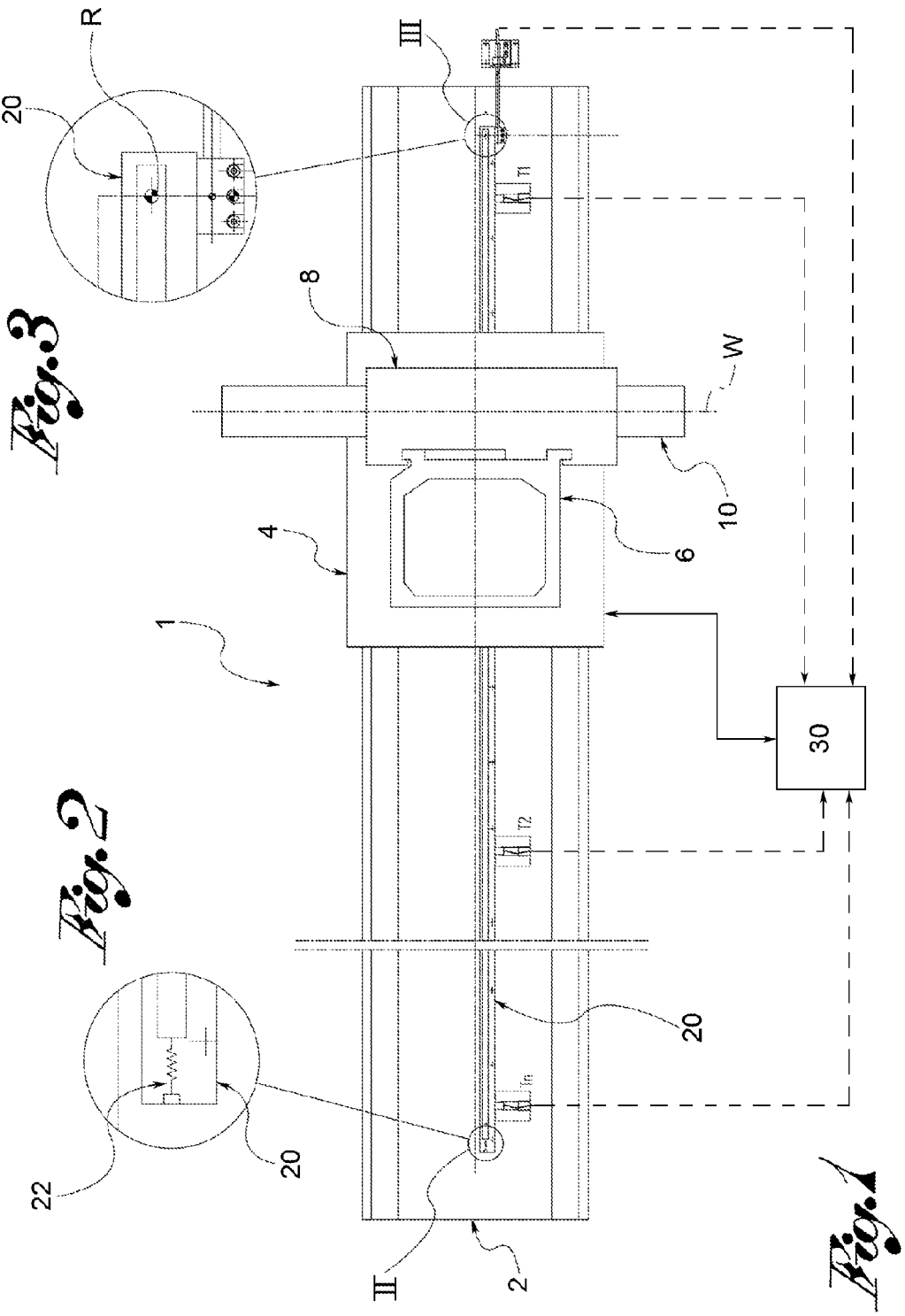

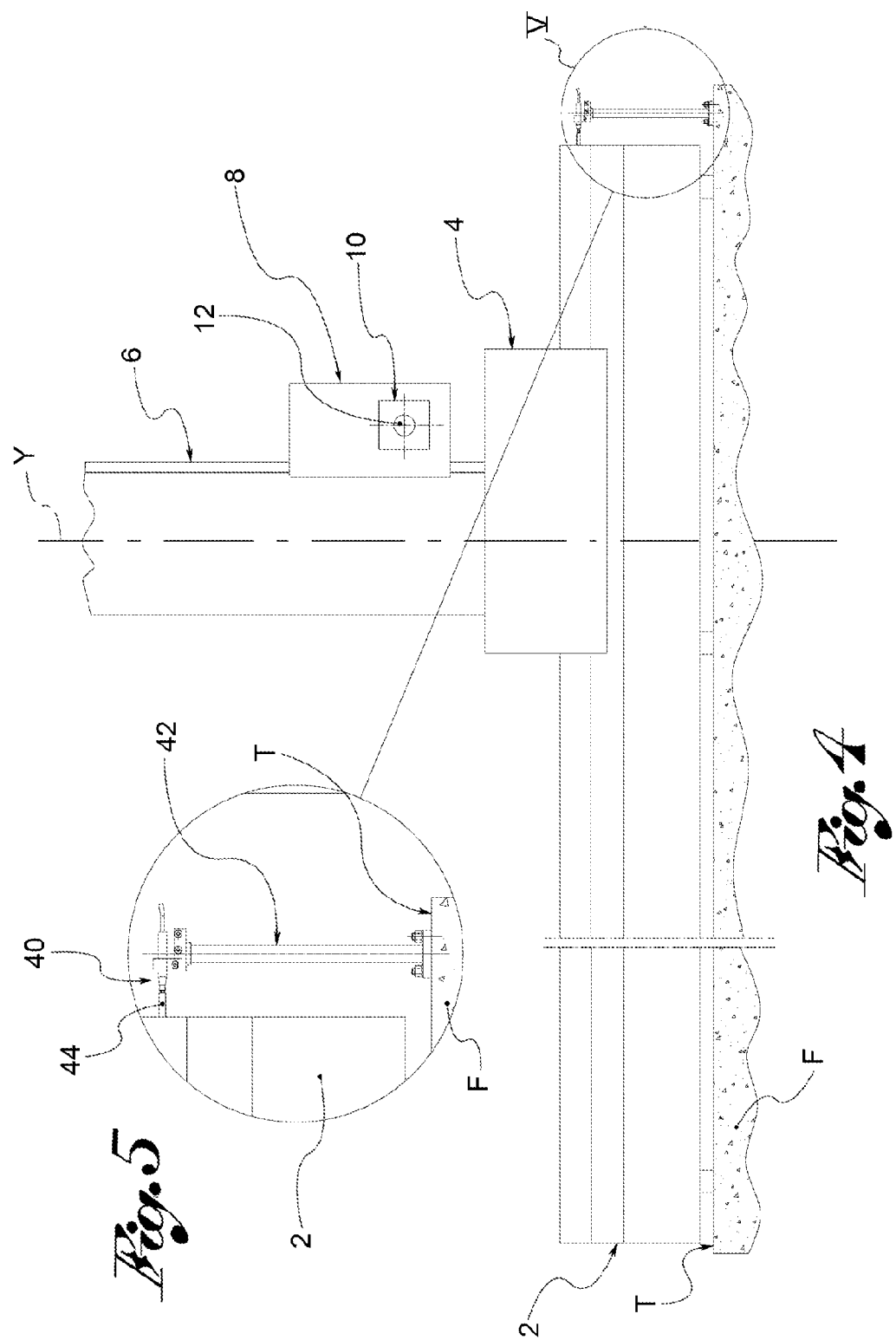

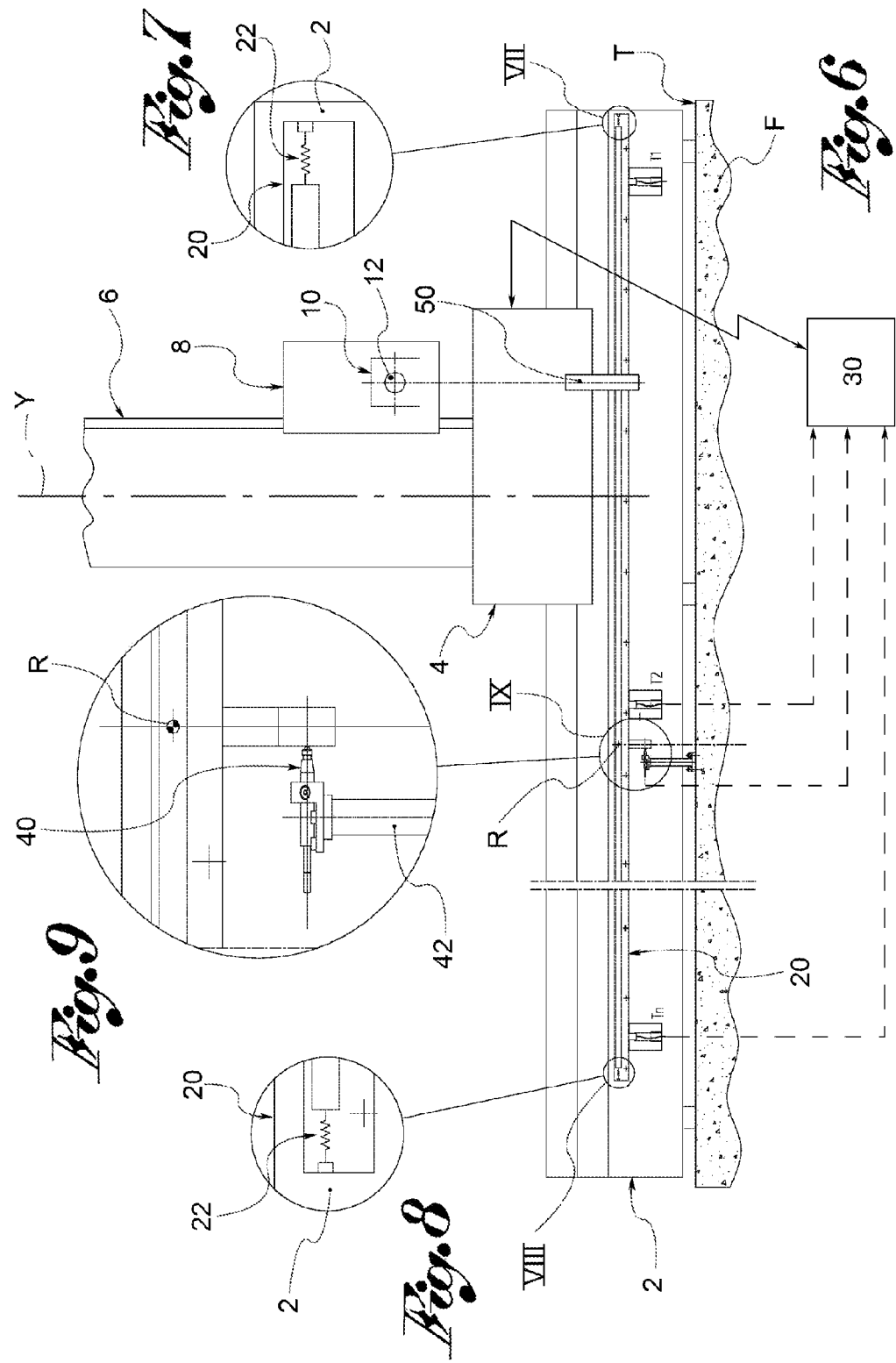

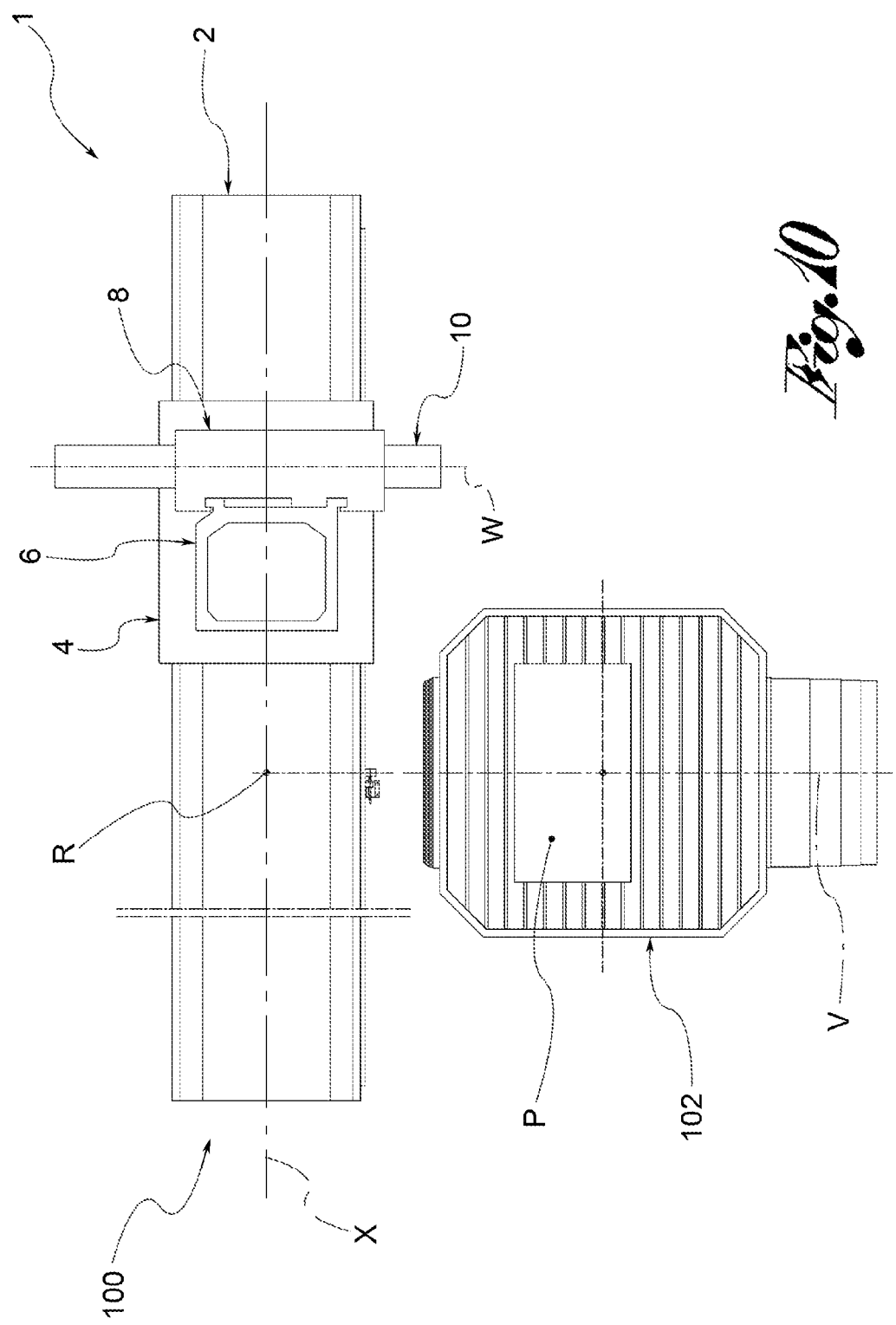

MACHINE TOOLS WHICH COMPENSATE FOR THERMAL DEFORMATION

CROSS-REFERENCE TO RELATED APPLICATIONS

This application is a National Phase Application of PCT International Application No. PCT/IB2011/055894, International Filing Date, Dec. 22, 2011, claiming priority to Italian Patent Application No. BS2011A000020, filed Feb. 25, 2011, each of which is hereby incorporated by reference in its entirety.

FIELD OF THE INVENTION

The subject of the present invention is a machine tool, in particular a machine tool of large dimensions, having a device for detecting and compensating the thermal deformations of the measuring means of the machine.

BACKGROUND OF THE INVENTION

The need is very much felt to perform high-precision mechanical machining operations on medium and large size mechanical pieces, in work environments not controlled in terms of temperature and humidity such as, for example, large plants located in cold or humid regions, generally where temperatures fall well below 15° C. and with large heat fluctuations between day and night.

In such work environments, it often occurs that, even during machining operations, the piece to be worked and the support on which it is mounted, separate from the machine tool, are cold, as is the surrounding environment, while the parts of the machine tend to heat up.

As is well known, this not only determines a deformation of the mandrel or the boring bar of the machine tool, such as to make it necessary to use compensation systems, but also a deformation of the measuring means of the machine, e.g., optical lines or linear encoders, introducing a further cause of imprecision of the machining operations.

SUMMARY OF THE INVENTION

The object of the present invention is to make a machine tool, in particular a machine tool of large dimensions, able to solve the aforementioned problem.

Such object is achieved by machine tools, for example of a large size, comprising:
- a bench having a main extension along a main axis;
- an upright base, which surmounts the bench and is supported by it, translatable in a controllable manner along the main axis;
- control elements of the translation of the upright base suitable for controlling the commanded translation of the upright base;
- a position sensor of the upright base, suitable for measuring the position of the upright base along the main axis, comprising an optical line or linear encoder, fixed to the bench, wherein a reference point on the optical line provides the origin of a main reference system;
- temperature detection elements of the optical line suitable for detecting the temperature of the optical line in at least one position along the main axis and for generating respective temperature signals;
- detection elements for detecting the movement of the reference point of the optical line, suitable for generating a reference point movement signal;
- management elements operatively connected to the temperature detection elements of the optical line, to the translation control elements of the upright base and to the detection elements for the point of reference movement, suitable for processing the temperature signals, the reference point movement signal and the signals of said translation control elements of the upright base to determine a correction signal for the translation control elements of the upright base.

BRIEF DESCRIPTION OF THE FIGURES

FIG. 1 shows a plan diagram of a machine tool according to an embodiment of the present invention.

FIGS. 2 and 3 show enlarged views of boxes II and III in FIG. 1.

FIG. 4 represents a front view of the machine tool in FIG. 1.

FIG. 5 shows an enlarged view of box V in FIG. 4.

FIG. 6 represents a plan view of a machine tool according to an embodiment of the present invention.

FIGS. 7, 8 and 9 show enlarged views of boxes VII, VII and IX respectively in FIG. 6.

FIG. 10 represents a plan diagram of a machining system according to an embodiment of the present invention.

DETAILED DESCRIPTION

With reference to the attached drawings, reference numeral 1 globally denotes a machine tool, e.g., a mill-boring machine of large dimensions, comprising a bench 2 having a main extension along a main axis X.

The bench 2 is secured and rests on foundations F and the supporting surface determines a horizontal T floor plane.

The machine 1 also comprises an upright base 4, which surmounts the bench 2 and is supported by this, translatable in a controllable way along the main axis X. For example, the machine 1 comprises control means of the translation of the upright base, operatively connected with a relative motorisation, to control the controlled translation of the upright base 4.

The machine 1 also comprises an upright 6, fastened on the upright base 4 and supported by this, having a main extension along a vertical axis Y, at right angles to the T floor plane. The upright 6 preferably has a boxed structure and is delimited by an annular side wall which extends along the vertical axis Y.

The machine 1 also comprises a carriage 8, supported by the upright 6, engaged with the side wall of this, translatable in a controllable way along the vertical axis Y. For example, the machine 1 comprises control means of the translation of the carriage, operatively connected with a relative motorisation, to control the controlled translation of the carriage 8.

The machine 1 also comprises a mandrel-holder 10, supported by the carriage 8, and a mandrel 12 supported by the mandrel-holder 10, rotatable around a work axis W, at right angles to the vertical axis Y and to the main axis X, to carry out the machining operations; preferably, the mandrel-holder 10 is translatable in the direction of the work axis W, in a controllable way. For example, the machine 1 comprises control means of the translation of the mandrel-holder, operatively connected with a relative motorisation, to control the controlled translation of the mandrel-holder 10.

The machine 1 has at least one position sensor suitable for detecting the position, with respect to a main reference system, of a translatable component of the machine tool 1.

For example, the machine 1 comprises a position sensor of the upright base 4, suitable for detecting the position of the upright base 4 along the main axis X. The position sensor, e.g., a linear encoder, comprises an optical line 20, fixed to the bench 2, e.g., on the upper surface of this, positioned along the main extension axis X of the bench.

The optical line 20 is fixed to the bench 2 in a reference point R; the reference point R realises the origin of the main reference system.

For example, the reference point R is close to the extremity of the bench 2.

According to an embodiment variation, the optical line comprises a measuring tape and a case; the case is fixed to the bench. Along the line, the case is split into sections, separated by elastic elements, to accommodate the expansions. Preferably, each section is fixed to the bench.

The machine 1 also comprises means for detecting the temperature of the optical line 20 suitable for detecting the temperature of the optical line in at least one position along the main axis X and generating respective temperature signals.

For example, the means for detecting the temperature of the optical line comprise a first temperature sensor T1, suitable for detecting the temperature of the optical line in a position in the proximity of the reference point R of the optical line 20, a second temperature sensor T2, suitable for detecting the temperature of the optical line in a position distant from the reference point R along the main axis X, and at least one further temperature sensor Tn, suitable for detecting the temperature of the optical line in a position further distant from the reference point R along the main axis X.

Preferably, the temperature sensors are in contact with the optical line.

The machine tool 1 also comprises management means 30 operatively connected to the means for detecting the temperature of the optical line and to the control means of the translation of the upright base, suitable for processing the temperature signals coming from the means for detecting the temperature of the optical line and the signals of the control means of the translation of the upright base to determine a correction signal for the translation control means of the upright base according to at least one temperature of the optical line and taking into account the linear heat expansion coefficient of the optical line.

For example, the management means are electronic control devices, e.g., comprising a PLC, a power board or a microprocessor.

According to a preferred embodiment, furthermore, the machine 1 comprises means for detecting the movement of the reference point R of the optical line, suitable for generating a reference movement signal.

For example, the means of detection of the movement of the reference point comprise a feeler 40 in contact with the reference point R of the optical line and supported by a fixed locator thermally separated from the bench, e.g., integral with the foundations F on which the machine tool rests.

For example, according to an embodiment, the feeler 40 is positioned at the extremity of the bench 2 corresponding to the reference point R of the optical line.

Preferably, the means of detection of the movement of the reference point comprise a column 42, fixed to the foundations F.

Preferably, furthermore, the means of detection of the movement of the reference point comprise a bar 44 made of substantially indeformable material, e.g., INVAR (with a linear heat expansion coefficient of $1*10^{-6}$ $1/°C.$), fixed on one side of the optical line in correspondence to the reference point and engaged with the feeler 40 on the other side.

The means of detection of the movement of the reference point are operatively connected to the management means 30 in order to determine a correction signal for the control means of the translation of the upright base according to at least one temperature read along the optical line and according to the signal of movement of the reference point R.

According to a further embodiment (FIG. 6), the reference point R which realises the origin of the main reference system, wherein the optical line is fixed to the bench, is in an intermediate position along the main axis X.

A machining system 100 comprises the above-described machine tool 1, a piece-holder table 102, positioned opposite the machine, and a piece P to be machined, supported by the piece-holder table (FIG. 10).

For the piece P to be machined or for the table 102, a piece/table V axis is generally identifiable, incident with the main axis X of the bench 2, e.g., at right angles to this.

In a preferred embodiment, the reference point R which realises the origin of the main reference system, wherein the optical line is preferably fixed to the bench, is at the intersection between the main axis X of the bench 2 and the piece/table V axis.

According to an even further embodiment (for the sake of convenience always shown in FIG. 6), the optical line 20 is fixed on a front face of the bench 2 and the position of the upright base 4 is detected by means of the appendix 50 integral with the upright base and detectable by the optical line.

For greater clarity, the description has been made above with reference to the translation of the upright base with respect to the bench, along the main axis X.

According to further embodiment variations, the inventive idea can be generalised by the translation of the carriage with respect to the upright, along the vertical axis Y, or by the translation of the mandrel-holder with respect to the carriage, along the work axis W.

According to embodiment variations, the above-expressed inventive idea can be applied to horizontal milling-boring machines, vertical mobile gantry milling machines, vertical milling machines with moving tables, turning and milling centres, rotary slot milling machines, roto-translating tables, horizontal machining centres, vertical machining centres, vertical boring machines, boring machines for deep holes, and transfer machines. In particular, it is particularly applicable to large-dimension machine tools, i.e., machine tools for removing shavings, wherein the horizontal dimensions are much greater than those of the single workstation; e.g., for large-dimension horizontal milling-boring machines, the minimum length of the bench is, for example, 4000 mm.

Innovatively, the machine tool according to the present invention permits an increase in precision of machining operations, including in a work environment which is not controlled in terms of temperature or humidity.

In particular, advantageously, the machine tool makes it possible to offset the elongation of the measuring parts of the machine itself, by cancelling to a large extent the harmful effect of heat deformations.

The invention claimed is:
1. A machine tool comprising:
a bench having a main extension along a main axis;
an upright base, which surmounts the bench and is supported by it, translatable in a controllable manner along the main axis;

control elements of the translation of the upright base suitable for controlling the commanded translation of the upright base;

a position sensor of the upright base, suitable for measuring the position of the upright base along the main axis, comprising an optical line or linear encoder, fixed to the bench, wherein a reference point on the optical line provides the origin of a main reference system;

temperature detection elements of the optical line suitable for detecting the temperature of the optical line in at least one position along the main axis and for generating respective temperature signals;

detection elements for detecting the movement of the reference point of the optical line, suitable for generating a reference point movement signal;

management elements operatively connected to the temperature detection elements of the optical line, to the translation control elements of the upright base and to the detection elements for the point of reference movement, suitable for processing the temperature signals, the reference point movement signal and the signals of said translation control elements of the upright base to determine a correction signal for the translation control elements of the upright base, wherein the reference point movement detection means comprise a bar made of a substantially heat-indeformable material, fixed on one side to the optical line in correspondence to the reference point.

2. The machine of claim 1, wherein the reference point is the fastening point of the optical line to the bench.

3. The machine of claim 1, wherein the substantially heat-indeformable material comprises INVAR.

4. The machine of claim 1, wherein the reference point movement detection elements comprise a feeler, supported by a fixed locator thermally separated from the bench.

5. The machine of claim 4, wherein the reference point movement detection elements comprise a feeler, supported by a fixed locator thermally separated from the bench.

6. The machine of claim 1, wherein the detection elements for detecting the temperature of the optical line comprise a plurality of sensors distributed spaced out along the main axis, in contact with the optical line.

7. The machine of claim 1, wherein the management elements comprise electronic components.

8. The machine of claim 7, wherein the electronic management elements comprise a PLC, and power board or a microprocessor.

9. The machine of claim 1, wherein the optical line is attached to the bench at one extremity of the bench along the main axis.

10. The machine of claim 1, wherein the optical line is attached to the bench in an intermediate position along the main axis.

11. The machine of claim 1, wherein the optical line is supported by the upper side of the bench.

12. The machine of claim 1, wherein the optical line is supported on a front side of the bench.

13. The machine of claim 1, comprising:
an upright, fixed to the upright base and supported by it, extending mainly along a vertical axis;
a carriage supported by the upright, translatable in a controllable manner along the vertical axis;
a mandrel-holder, supported by the carriage, and a mandrel supported by the mandrel-holder, rotatable around a work axis, at right angles to the vertical axis and the main axis, to carry out the processing, wherein the mandrel-holder is translatable in the direction of said work axis, in a controllable manner.

14. The machine of claim 1, selected from the group consisting of: a horizontal milling-boring machine, a vertical mobile gantry milling machine, a vertical milling machine with moving table, a turning and milling centre, a rotary slot milling machine, a roto-translating table, a horizontal machining centre, a vertical machining centre, a vertical boring machine, a boring machine for deep holes, and a transfer machine.

15. The machine tool of claim 1, selected from the group consisting of: horizontal milling-boring machines, a vertical mobile gantry milling machine, a vertical milling machine with moving table, a turning and milling centre, a rotary slot milling machine, a roto-translating table, a horizontal machining centre, a vertical machining centre, a vertical boring machine, a boring machine for deep holes, and a transfer machine.

16. A system for a machine tool comprising:
foundations made in the ground which define a horizontal plane; and
the machine tool of claim 1, wherein the machine tool is supported by the foundations.

17. The system of claim 16, comprising:
a piece-holder table positioned opposite the machine tool;
a piece to be processed supported by the piece-holder table, wherein for the piece or the table a piece/table axis may be defined incident to the main axis of the machine tool;
wherein the optical line is attached to the bench in an intermediate position along the main axis and a point of reference may be defined for it as the origin of the reference system, said point of reference corresponding to the intersection between the main axis and the piece/table axis.

18. A method for positioning an upright base of a machine tool along a bench extending along a main axis, comprising the steps of:
acquiring at least one temperature value of an optical line or linear encoder arranged along the bench, wherein for the optical line a point of reference can be identified as origin of the reference system;
detection of the movement of the reference point of the optical line;
processing the temperature value to determine the shift value due at least to the temperature incurred by an ideal position of the optical line and to determine a correct position along the optical line depending on the ideal position and the shift value, on the basis of the linear heat expansion coefficient of the optical line and according to the shift of the reference point; and
translating the upright base along the bench to the correct position.

19. A machine tool comprising:
a bench extending along a main axis;
an upright base, which surmounts the bench and is supported by it, translatable in a controllable manner along the main axis;
an upright, fixed to the upright base and supported by it, extending mainly along a vertical axis;
a carriage supported by the upright, translatable in a controllable manner along the vertical axis;
carriage translation command devices suitable for controlling the imposed translation of the carriage;
a carriage position sensor, suitable for detecting the position of the carriage along the vertical axis, comprising an optical line or linear encoder, fixed to the upright, for which a point of reference is identifiable as the origin of a reference system;

temperature detection elements of the optical line suitable for measuring the temperature of the optical line in at least one position along the vertical axis and to generate respective temperature signals;

detection elements for detecting the shift of the reference point of the optical line suitable for generating a point of reference shift signal; and management elements operatively connected to the temperature detection elements of the optical line and to the translation control elements of the carriage and to the point of reference shift detection elements suitable for processing the temperature signals, the point of reference shift signal and the signals of said carriage translation control elements to determine a correction signal for the carriage translation control elements.

20. The machine tool of claim 19, chosen from the group comprising horizontal milling-boring machines, a vertical mobile gantry milling machine, a vertical milling machine with moving table, a turning and milling centre, a rotary slot milling machine, a roto-translating table, a horizontal machining centre, a vertical machining centre, a vertical boring machine, a boring machine for deep holes, a transfer machine, for example of a large dimension.

21. A machine tool comprising:

a bench extending along a main axis;

an upright base, which surmounts the bench and is supported by it, translatable in a controllable manner along the main axis;

an upright, fixed to the upright base and supported by it, extending mainly along a vertical axis;

a carriage supported by the upright, translatable in a controllable manner along the vertical axis;

a mandrel-holder, supported by the carriage, and a mandrel supported by the mandrel-holder, rotatable around a work axis, at right angles to the vertical axis and the main axis, to carry out the processing, wherein the mandrel-holder is translatable in a controlled manner in the direction of said work axis;

a position sensor of the mandrel-holder, suitable to detect the position of the mandrel-holder along the work axis, comprising an optical line or linear encoder, fixed to the upright, for which a point of reference is identifiable as the origin of the reference system;

temperature detection elements of the optical line suitable for detecting the temperature of the optical line in at least one position along the work axis and to generate respective temperature signals;

detection elements for detecting the shift of the point of reference of the optical line, suitable for generating a point of reference shift signal;

management elements operatively connected to the temperature detection elements of the optical line and to the translation control elements of the mandrel-holder, and to detection elements for detecting the shift of the point of reference, suitable for processing the temperature signals, the reference point shift signal and the signals of said control elements of the translation of the mandrel-holder to determine a correction signal for the control elements of mandrel-holder translation.

* * * * *